(12) United States Patent
Dougherty et al.

(10) Patent No.: US 6,935,044 B2
(45) Date of Patent: Aug. 30, 2005

(54) CONNECTION SYSTEM FOR A FLUID LEVEL MEASURING DEVICE

(75) Inventors: John M. Dougherty, Clark, MO (US); Michael H. Schmidt, Moberly, MO (US); Scott A. Dierks, Moberly, MO (US); Steven W. Marek, Moberly, MO (US)

(73) Assignee: Orscheln Products LLC, Moberly, MO (US)

( * ) Notice: Subject to any disclaimer, the term of this patent is extended or adjusted under 35 U.S.C. 154(b) by 0 days.

(21) Appl. No.: 10/172,632

(22) Filed: Jun. 13, 2002

(65) Prior Publication Data

US 2002/0189344 A1 Dec. 19, 2002

Related U.S. Application Data

(60) Provisional application No. 60/297,914, filed on Jun. 13, 2001.

(51) Int. Cl.[7] .................................... G01F 23/04
(52) U.S. Cl. ......................................... 33/728
(58) Field of Search .................... 73/290 R, 298, 73/299, 304 R, 304 C; 116/227; 285/31, 33; 33/722–731; 403/324, 378, 379.1, 379.6, 379.5

(56) References Cited

U.S. PATENT DOCUMENTS

| | | | |
|---|---|---|---|
| 1,456,333 A | 5/1923 | Nelson | |
| 1,550,302 A | 8/1925 | Zarobsky | |
| 1,593,847 A | 7/1926 | Reid | |
| 1,681,431 A | 8/1928 | Pribil | |
| 1,697,814 A | 1/1929 | Forbes | |
| 1,864,138 A | 6/1932 | Machonis | |
| 1,887,700 A | 11/1932 | Stevens | |
| 2,239,402 A | 4/1941 | Sachs | |
| 2,333,838 A | 11/1943 | Wilson | |
| 2,443,294 A | 6/1948 | Bickle | |
| 2,474,805 A | 7/1949 | Coderre | |
| 2,705,372 A | 4/1955 | Cornell | |
| 2,879,914 A | 3/1959 | Fleckenstein | |

(Continued)

FOREIGN PATENT DOCUMENTS

| | | | |
|---|---|---|---|
| DE | 419886 | 10/1925 | |
| DE | 26 17 150 A1 | 4/1976 | |
| DE | 4122288 | 3/1992 | |
| FR | 771315 | 6/1933 | |
| FR | 1090791 | * 4/1955 | ................. 33/728 |
| FR | 1458582 | 10/1966 | |
| FR | 2 714 178 A1 | 12/1993 | |
| FR | 2715224 | 7/1995 | |
| GB | 1 201 671 | 2/1968 | |
| GB | 2 266 590 A | 4/1992 | |
| JP | JA0296115 | 11/1989 | |

OTHER PUBLICATIONS

AMERICAN HERITAGE DICTIONARY, 1984, definition of "slot".*
U.S. Appl. No. 10/118,482.
U.S. Appl. No. 10/261,854.
U.S. Appl. No. 10/340,700.
U.S. Appl. No. 10/741,210 Moeller Products Company Home Page May 17, 2001, http//www.moellerproducts.com.

*Primary Examiner*—Robert Raevis
(74) *Attorney, Agent, or Firm*—Michael K. Boyer

(57) ABSTRACT

A connection system for a fluid level measuring system is disclosed. The disclosed connection system comprises an outer member (also known as a boss), at least one retaining means or clip, and a tube that has been previously shaped and in receptive within the outer member. The end of the tube not received within the outer member is associated with a cap or handle for inserting and removing a fluid level indicator blade (or dipstick).

19 Claims, 3 Drawing Sheets

U.S. PATENT DOCUMENTS

| | | | |
|---|---|---|---|
| 3,296,703 A | 1/1967 | Stade et al. |
| 3,349,944 A | 10/1967 | Moeller |
| 3,377,708 A | 4/1968 | Gassman et al. |
| RE26,422 E | 7/1968 | Stade et al. |
| 3,474,884 A | 10/1969 | Braun |
| 3,488,855 A | 1/1970 | Howe |
| 3,594,906 A | 2/1970 | Kerfoot |
| 3,662,470 A | 5/1972 | Sasgen |
| 3,722,102 A * | 3/1973 | Jackson et al. ............... 33/731 |
| 3,738,176 A | 6/1973 | Kerfoot |
| 3,739,933 A | 6/1973 | Degaetano |
| 3,885,317 A | 5/1975 | Karls |
| 3,927,783 A | 12/1975 | Bogert |
| 3,972,234 A | 8/1976 | Osojnak |
| 4,021,924 A | 5/1977 | Haines |
| 4,072,245 A | 2/1978 | Sloan, Jr. |
| 4,102,472 A | 7/1978 | Sloan, Jr. |
| 4,110,909 A * | 9/1978 | Mayr et al. ................... 33/725 |
| 4,235,186 A | 11/1980 | Frobose |
| 4,266,344 A | 5/1981 | Richardson |
| 4,276,694 A | 7/1981 | Richardson |
| 4,363,336 A | 12/1982 | Cerrato |
| 4,392,583 A | 7/1983 | Wong |
| 4,406,301 A | 9/1983 | Cerrato |
| 4,498,599 A | 2/1985 | Avrea |
| 4,510,690 A | 4/1985 | Attler |
| 4,531,293 A | 7/1985 | Grinde |
| 4,596,141 A | 6/1986 | Kondo |
| 4,761,886 A | 8/1988 | Wilson et al. |
| 4,779,876 A | 10/1988 | Novosad |
| 4,881,486 A * | 11/1989 | Willis |
| 4,902,043 A | 2/1990 | Zillig et al. |
| 4,941,268 A | 7/1990 | Tausk |
| 4,965,942 A | 10/1990 | Hoszowski |
| 4,988,975 A | 1/1991 | Nap |
| 5,007,287 A | 4/1991 | Nagai |
| 5,014,445 A | 5/1991 | Martell |
| 5,036,996 A | 8/1991 | Epstein |
| 5,071,020 A | 12/1991 | Reutter |
| 5,086,943 A * | 2/1992 | Poskie ........................ 33/727 |
| 5,113,594 A * | 5/1992 | Ishihara et al. ............... 33/726 |
| 5,160,021 A | 11/1992 | Sibley et al. |
| 5,325,981 A | 7/1994 | Klomhaus et al. |
| 5,335,641 A | 8/1994 | Schnabel |
| 5,361,924 A | 11/1994 | Muller |
| 5,394,850 A * | 3/1995 | Murphy et al. ............. 123/470 |
| 5,466,020 A | 11/1995 | Page et al. |
| 5,485,681 A | 1/1996 | Hitchcock |
| 5,535,849 A | 7/1996 | Few |
| 5,779,283 A * | 7/1998 | Kimura et al. ............. 285/305 |
| 5,829,153 A * | 11/1998 | Hitchock ..................... 33/728 |
| 6,314,808 B1 | 11/2001 | Williams et al. |
| 6,452,740 B1 | 9/2002 | Ghoshal |
| 6,547,221 B1 * | 4/2003 | Bork et al. ............. 256/65.01 |

* cited by examiner

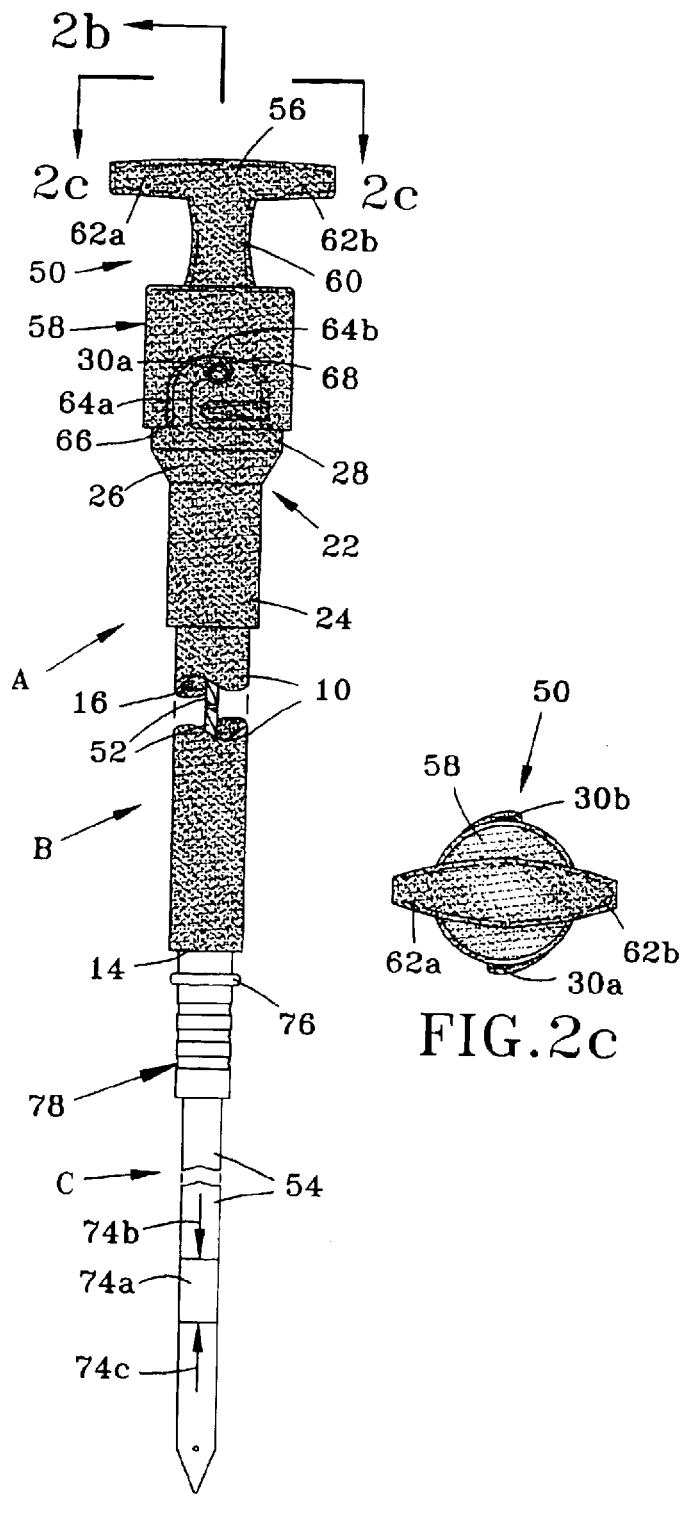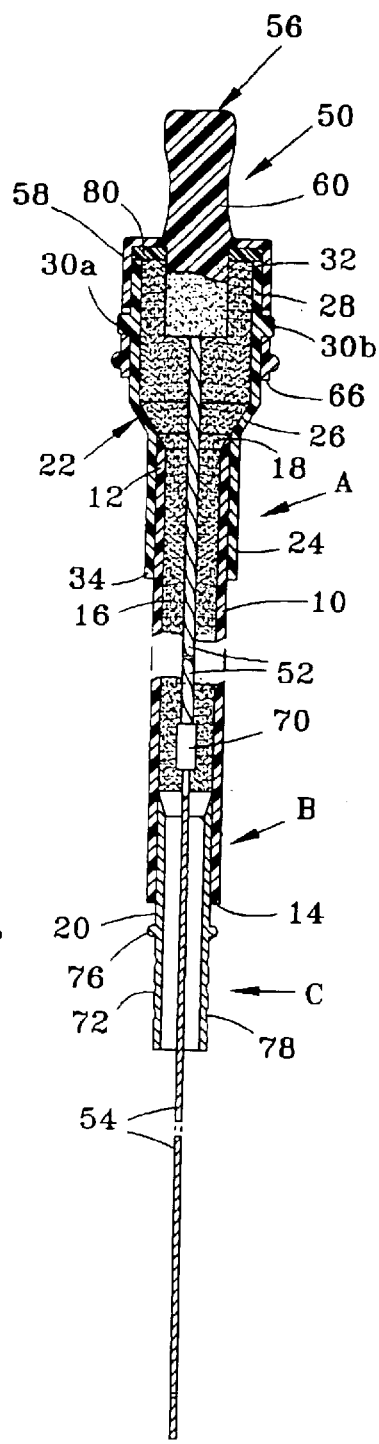
FIG.2a  FIG.2c  FIG.2b

CONNECTION SYSTEM FOR A FLUID LEVEL MEASURING DEVICE

CROSS-REFERENCE TO RELATED PATENTS AND PATENT APPLICATIONS

The subject matter of the invention is related to U.S. patent application Ser. No. 08/976,781, filed on Nov. 24, 1997, entitled "Fluid Level Measuring Device", now U.S. Pat. No. 6,314,808 B1; U.S. patent application Ser. No. 60/221,017, filed on Jul. 27, 2000 and entitled "Fluid Level Measuring Device"; U.S. patent application Ser. No. 60/326,636, filed on Oct. 01, 2001 and entitled "Fluid Level Measuring Device"; and U.S. patent application Ser. No. 60/347,490, filed on Jan. 09, 2002 and entitled "Fluid Level Measuring Device". The disclosure of these applications is hereby incorporated by reference.

The subject matter herein claims benefit under 35 U.S.C. 119(e) of U.S. patent application Ser. No. 60/297,914, filed on Jun. 13, 2001 and entitled "Connection System For A Fluid Level Measuring Device"; the disclosure of which is hereby incorporated by reference.

FIELD OF THE INVENTION

The subject invention is directed to a device used to measure fluid levels, and more particularly, to dipsticks used to measure fluid levels by immersing an indicator at one end of the dipstick into a fluid holding compartment or reservoir.

BACKGROUND OF THE INVENTION

With internal combustion engines, transmissions, and other machinery requiring fluids for lubrication and cooling, it is known to use a fluid measuring device for indicating the fluid level in a selected fluid holding compartment. Typically, the fluid measuring device is a dipstick for checking the level of fluid such as engine or transmission oil, or hydraulic fluid within one of the many fluid holding compartments in the engine, transmission, or other machine. The dipstick is normally an elongated indicator that is slidably located within a conduit or pipe attached to the engine, transmission, or machine in which a fluid level indication is desired. When the dipstick is fully inserted into the conduit, one end is immersed into the fluid. When an actual reading of the fluid level is desired, the other end of the dipstick is pulled from the conduit thereby removing the entire dipstick from the conduit to allow the user to read the fluid level from the one end. The dipstick is then reinserted into the fluid compartment once the fluid level has been checked.

Traditional fluid level indicator systems typically consist of a two piece system with a holding tube and a dipstick. Examples of conventional dipstick systems are disclosed in U.S. Pat. Nos. 3,371,418; 5,485,681 and 5,829,153; the disclosure of each of which is hereby incorporated by reference. The holding tubes are generally fabricated from metal tubing and require various forming operations including bending, flaring, and machining, followed by the attachment of a dipstick receptacle. In addition, the dipstick is fabricated from multiple components including a handle, washer, cap, rubber stopper, shaft assembly, and a marked spring steel shaft mechanically joined to a spring steel blade. The actual assembly of these various components involves multiple assembly operations requiring costly, time-consuming, and labor intensive manufacturing steps.

In addition, today's engines, transmissions, and machinery designs are smaller, more compact, and of less weight than traditional engines, transmissions, and machinery. Therefore, fluid level indicator systems must be smaller, more compact, and lighter weight. Moreover, the fluid access routes or paths through which the fluid level indicator system accesses the fluid storage compartments are becoming more complex (more twists and turns as well as longer runs), smaller, and more compact.

There is a need in this art for an improved method and means for connecting the fluid level indicator to the fluid containing reservoir (e.g., transmission, engine oil pan, among others), or to a tube extending from the fluid containing reservoir. There is also a need for a fluid level indicator connection system that permits disconnection for repairs (and in some cases maintenance), and which is resistant to engine operation as well as other vibrations associated with vehicle usage.

SUMMARY OF THE INVENTION

The instant invention solves problems associated with fluid level measuring systems by providing an improved system for connecting the fluid level measuring system to the fluid containing reservoir. The inventive system comprises an outer member (also known as a boss), at least one retaining means or clip, and a tube that has been previously shaped and, normally, receptive within the outer member. Normally, the connection system will also include an O-ring that is located about the tube. The end of the tube not received within the outer member is associated with a cap or handle for inserting and removing a fluid level indicator blade (or dipstick).

In one aspect of the invention, an O-ring is mounted within the outer member. In another aspect of the invention, an O-ring is located around an exterior surface of the tube. The tube is inserted into the outer member and maintained at a predetermined position within the outer member by a retaining clip (e.g., pin, clip, snap ring, among other retaining devices).

Still other advantages and benefits of the invention will become apparent to those skilled in the art upon understanding of the following detailed description.

BRIEF DESCRIPTION OF THE DRAWINGS

The invention may take physical form in certain parts and arrangements of parts, certain aspects and methods of which will be described in detail in this specification and illustrated in the accompanying drawings that form a part hereof, and wherein:

FIGS. 2A through 2C illustrate a fluid level measuring device that can employ the inventive connection system.

DETAILED DESCRIPTION

Figure 1A:
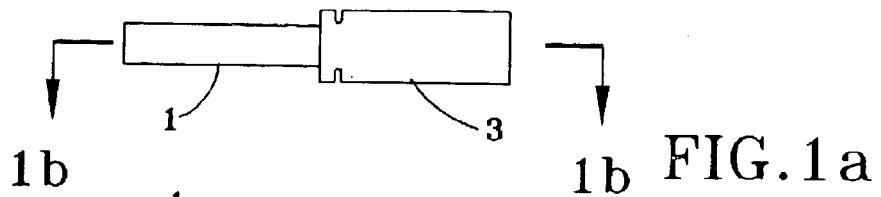
FIGS. 1A through 1F illustrate assembled and disassembled views of an aspect of the instant invention.

The instant invention relates to a fluid level indicator system comprising a handle, a shaft (optionally rotatably mounted) and dipstick affixed to the handle, a stationary tube having an opening for receiving the handle (e.g., as illustrated in the patents referenced in the "Background of the Invention", and Patents and Patent Applications referenced in the "Cross Referenced Patents and Patent Applications"), and a connection system for affixing the stationary tube to a fluid reservoir or another stationary tube that is affixed to the fluid reservoir. The connection system provides fluid passage between the stationary tube and the fluid reservoir or another stationary tube that is affixed to the fluid reservoir. The connection system may also permit the fluid level indicator blade to be inserted into the fluid reservoir.

The fluid level indicator system can comprise a shaft having a fluid level measuring blade at one end and affixed to a handle on the other. The shaft can comprise wire or a flexible blade. The shaft can be affixed to the handle by any suitable method such as plastic overmolding, pinning, gluing, among other methods. The handle typically includes knurled regions, a T-handle, among other features in order to enhance the ease with which a vehicle operator can turn the handle and remove the shaft to check the fluid level. The handle can include slots that engage either inwardly or outwardly extending lugs or protuberances upon the end of a stationary tube that receives the shaft. That is, the handle can be received within the tube or dimensioned to extend along an exterior portion of the tube. In some cases, the opening of the tube is enlarged by attaching a coupler or spout on the end of the tube. The slots on the handle normally engage the lugs on the tube (or coupler) in a bayonet (insert and twist) type of movement. A compressible gasket is normally provided in the base of the handle in order to provide a pressurized seal (thereby reducing, if not preventing, fluid from exiting via the fluid level indicating system). The compressible gasket can also function to bias the handle into a locked position relative to the stationary tube.

The connection system comprises one end of the stationary tube having a predetermined configuration, a hollow cylindrical outer member or boss, an O-ring and at least one retaining member or means. The outer member or boss defines a slot or groove for receiving a retaining means or clip that maintains the stationary tube at a fixed and predetermined location within the outer member. If desired the retaining means can comprise a "snap-fit" arrangement wherein a compressible ring or plurality prongs are located within the outer member or upon the stationary tube. The retaining means can also comprise a previously installed snap ring or clip that is expanded when the stationary tube is inserted into the outer member. The previously installed compressible ring, compressible prongs, snap ring or clip returns to its normal position after the stationary tube travels past a defined point thereby retaining the tube at a predetermined location within the cylindrical member.

The stationary tube can be shaped into a wide range of liner or non-liner configurations. A flange, seat or protuberance is defined adjacent the end of the tube received within the outer member. By "adjacent" as used in this specification and the claims, unless expressly stated otherwise, means two components that are in contact with each other, are next to each other with a space separating them, or are next to each other with a third component in between. The flange, seat or protuberance engages (typically an interior portion of) the outer member and defines the maximum travel of the tube into the outer member. The seat or protuberance, along with the O-ring, defines a fluid seal.

The stationary tube is inserted into the outer member, beyond the aforementioned slot, and into contact with a first and second surface within the outer member. The first surface has a diameter greater than the diameter of the seat or protuberance on the tube. The first surface contacts the seat when the tube is inserted into the outer member. The outer member also defines a second surface (or interior diameter) that is greater than the outer diameter of the stationary tube but less than the outer diameter of the seat or protuberance. That is, the second surface accommodates the portion of the stationary tube between the seat and end of the tube. Alternatively, the stationary tube can be dimensioned to receive what was formerly referred to as the outer member. That is, the stationary tube travels over the member wherein an inwardly extending flange on the interior of the tube or an outwardly extending flange of the member defines the extent of travel.

In one aspect of the invention, an inner surface of the outer member defines a channel or groove for receiving an O-ring. The O-ring is normally located such that the seat contacts the first surface of the outer member. The contact between the seat and first surface along with the O-ring provide a fluid seal.

In another aspect of the invention, the O-ring is located adjacent to the seat and about the stationary tube. As the seat and O-ring are inserted into the outer member, the O-ring contacts the first surface. The O-ring becomes located between the seat and the first surface thereby providing a fluid seal. If desired the outer member can also include additional O-rings in the manner described above.

In a further aspect of the invention, the connection system is located between the fluid level measuring device and another or second stationary tube. That is, the connection system provides a connection between the fluid level measuring device and a secondary stationary tube or another tubular structure. The second stationary tube can be installed by the engine manufacture and directly connected to the fluid reservoir. In conventional practice, the second stationary tube is removed and replaced with a fluid level measuring device. In this aspect of the invention, the inventive connection system can be used for connecting the secondary stationary tube to the fluid level measuring device without removal of the secondary stationary tube. The stationary tube or secondary stationary tube can possess any desirable configuration and length.

The tube is maintained at a fixed location within the outer member by a retaining means or clip. After the tube has been inserted into the outer member and wherein the seat (or O-ring) is in contact with the first surface of the outer member, a retaining means is inserted into a slot defined on the outer member. That is, the retaining means is inserted into the slot in a direction perpendicular to the longitudinal axis of the stationary tube. Once installed the retaining means contacts the slot and seat thereby preventing the tube from exiting the outer member. If desired, the clearance between the slot and seat can be such that the seat is biased or compressed against the first surface (of the outer member) and/or O-ring. Such a bias can reduce vibrational affects and improve leak resistance. If desired, the retaining means can be removed thereby permitting withdrawal of the tube from the outer member.

If desired, the retaining means comprises a compression or snap fit connection wherein a protuberance or ring extending from the surface of the stationary tube or outer member engages a locking surface on the other member. The snap fit retaining means can be combined with the previously described clip and O-ring.

Further, the retaining means can comprise a previously installed clip or retaining means that functions similar to a compression, wrist pin, snap ring or snap fit connection. The previously installed clip or retaining means can be located within the outer member prior to insertion of the stationary tube. The previously installed clip or retaining means expands as it is contacted by the stationary tube and returns to its normal position after a flange upon the stationary tube has traveled past the retaining means.

The outer member can be fabricated by any suitable method such as screw machining, die casting, among other conventional methods. The stationary tube can be fabricated by using a commercially available tube/pipe bending equipment and methods. The outer member and tube can be fabricated from commercially available materials such as steel, stainless steel, mineral filled polymeric systems, among other materials capable of withstanding the heat and fluid pressure associated with the fluid reservoir. The handle of the fluid level measuring device can be fabricated by any suitable process such as plastic injection molding.

Figure 1B:
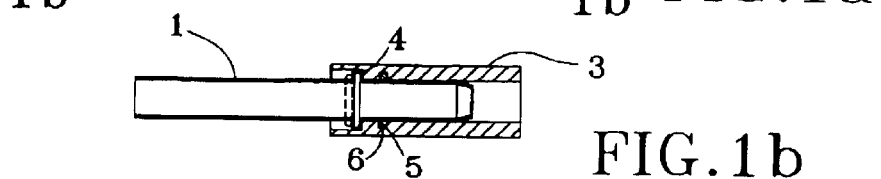
Figure 1C:
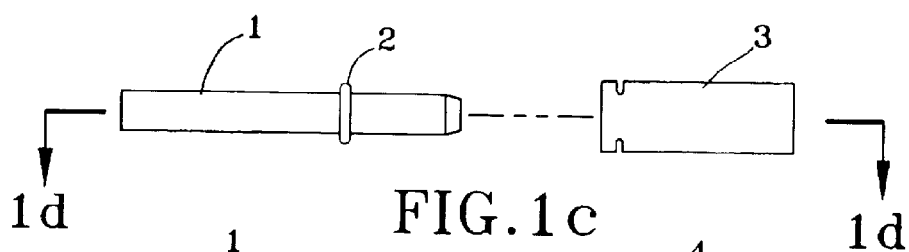
Figure 1D:
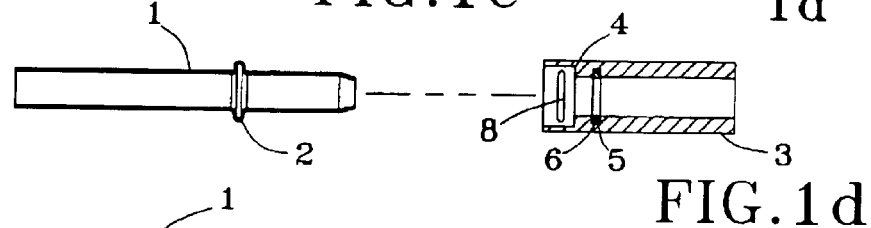
Figure 1E:
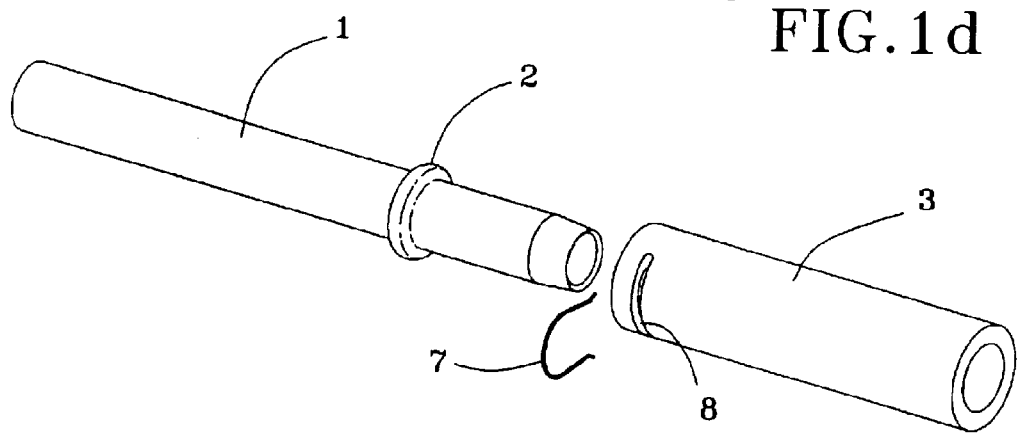
Figure 1F:
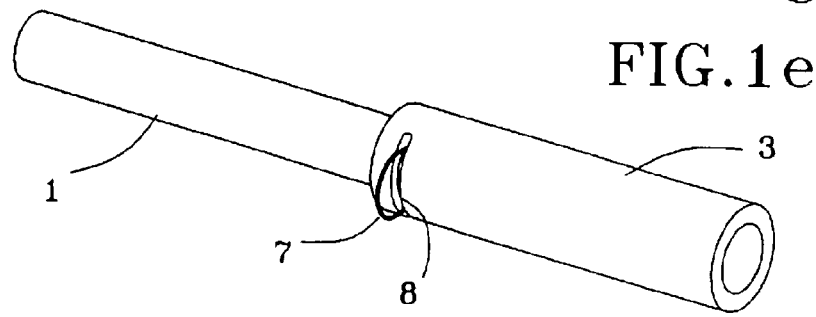

Referring now to the drawings wherein the showings are for the purposes of illustrating certain aspects of the invention only and not for purposes of limiting the invention, the overall arrangement of such aspects of the connection system can best be understood by reference to FIGS. 1A–F. FIGS. 1A–F illustrate one aspect of the invention wherein an O-ring is located in a channel or groove defined within the outer member. FIGS. 1A, 1B and 1E illustrate the seat of the stationary tube in contact with the first surface of the outer member. FIGS. 1C, 1D and 1F illustrate slots within the outer member for receiving a retaining means that maintains the tube in a predetermined position. These Figures illustrate two slots on opposite sides of the outer member. When the retaining means comprises a clip (e.g., wire clip), both ends of the clip are slightly compressed and inserted into one slot and the clip is pushed towards a second slot. The clip ends exit the second slot and expand slightly thereby becoming located within the slots and in turn maintaining the tube within the outer member.

Referring now to FIGS. 1A through 1F, these Figures show stationary tube 1 having flange or protuberance 2. Stationary tube 1 is received within outer member 3. Outer member 3 an interior surface 4 for engaging flange 2. Outer member 3 also defines an interior groove or channel 5 for receiving an O-ring 6. After inserting tube 1 into outer member 3, tube 1 is maintained in a fixed position relative to the outer member 3 by inserting a clip 7 through an opening 8 defined in the outer member 3.

Referring now to FIGS. 2A through 2C and 3, FIGS. 2 and 3 illustrate two types of fluid level measuring devices that can employ the inventive connection system such as illustrated in FIGS. 1A through 1F. The inventive connection system is employed on the end of the illustrated fluid level measuring devices adjacent to the engine fitting or engine reservoir (i.e., distal from the handle).

Referring now to FIGS. 2A through 2C, these Figures illustrate a fluid level measuring device A comprises a stationary tube assembly B with a dipstick assembly C removably and rotatably disposed therein. Specifically, tube assembly B is an elongated, hollow guide tube 10 with first and second spaced ends 12 and 14 having a through passage 16 that communicates with first and second openings 18 and 20 at the respective first and second ends.

The tube assembly B further includes an enlarged diameter coupler or spout 22 attached to the first end 12 of the guide tube 10. In one aspect, the coupler is joined to the first end 12 of the guide tube as described herein. The coupler 22 has a small diameter portion 24, a flare or tapered transition portion 26, and a large diameter portion 28 at its second end. The small diameter portion is closely received over the guide tube first end. The large diameter portion includes a pair of outwardly extending lugs 30A and 30B that form a portion of a locking assembly to be described in greater detail below. The coupler is also hollow, defining a continuous internal cavity that extends from a first or upper end 32 to a second or lower end 34. The internal cavity is enlarged at the upper end to accommodate an interconnection between the shaft and a handle, and, if desired, to provide an orifice for receiving a spout on a fluid container, such as an oil container. For example, the spout of a standard quart of oil will fit in this enlarged upper end. Alternatively, the enlarged upper end may be dimensioned to receive a different sized oil container. It will be appreciated, however, that the enlarged upper end will eliminate use of a funnel in many instances.

Dipstick assembly C includes a plastic molded handle assembly 50, an elongated relatively stiff, yet bendable shaft 52 such as the stranded wire rope illustrated in the drawings, and a fluid level indicator blade 54. The shaft 52 can be fixed or rotatably mounted within plastic molded handle assembly 50, e.g., the shaft 52 can rotate and flex while being inserted along the typically non-liner length of the stationary tube. The handle 50 includes gripping portion 56 connected to a hollow cylindrical base 58 by a neck 60 of reduced dimension. The gripping portion preferably has a pair of knobs 62A and 62B extending outwardly and obliquely from the neck 60. The base 58, on the other hand, has a pair of slots 64A and 64B defined therein. In one specific aspect, each slot extends entirely through the base sidewall and is of a generally curvilinear conformation. The slots have an opening at one end along lower edge 66 of the base and a locking seat 68 at the other end of the curvilinear slot. Each of the curvilinear slots 64A and 64B is defined so as to have an axial portion aligned approximately with the shaft, and likewise the tube assembly B, and positioned adjacent the lower edge 66 of the base 58, and a generally transverse portion at the other end of the slots and in which locking seat 68 is defined.

The combination of slot 64A and 64B with lugs 30A and 30B defines a locking mechanism or bayonet type interconnection where lugs 30A and 30B slide in slots 64A and 64B. Axial insertion of the handle over the lugs and a quarter turn causes the handle base to slide over the coupler 22 whereby the lugs 30A and 30B become positively engaged in corresponding locking seats 68.

Shaft 52 is associated with but not permanently joined, bonded, molded or glued, to handle assembly 50. Shaft 52 is provided within assembly 50 in a manner that achieves a secure interconnection. Fluid level indicator blade 54 is affixed to the other end of the shaft 52 by die casting (or alternatively, by a staked attachment fitting 70 or other suitable mechanical connection). The die cast construction eliminates tolerance stack-up problems associated with prior arrangements, reduces the number of components, and provides a smooth transition fitting that does not catch in the guide tube. The indicator blade 54 is typically rounded or pointed at its free end to allow for easy insertion into the coupler 22, through the guide tube 10, and through connection system 72 (e.g., refer to FIGS. 1A through 1F). The indicator blade also includes indicia, such as shaded area 74A and arrows 74B and 74C on at least one of the faces of the blade, for indicating the fluid level when dipstick assembly C is inserted fully into stationary tube assembly B that extends from the engine fitting.

In some cases, a lip 76 prevents connection system 72 from complete insertion into elongated guide tube 10 (i.e., when the stationary tube is inserted over instead of into the outer member). The opposite end of connection system 72 is attached or bonded to a fluid reservoir or tank, such as found in an internal combustion engine, where it is desirous to measure the fluid level within the reservoir, or to a secondary tube that is connected to the fluid reservoir or tank. In one specific aspect, the coupling system is made of steel and has a serrated outer surface 78 (although alternatively, the outer surface may be roughened, knurled, or of other texture).

With the connection system 72 connected to a fluid reservoir and providing access for dipstick assembly C, the opposite end of stationary tube assembly B, i.e., the coupler 22, is secured at a convenient location remote from connection system 72. The elongated through passageway that connects coupler 22 and connection system 72 thereby provides access to the fluid in the reservoir via dipstick assembly C. Specifically, fluid level indicator blade 54 is inserted through the coupler and guide tube 10 such that the free end of blade 54 is immersed into the fluid in the reservoir. It will be appreciated that since the shaft is bendable and rotatable, the guide tube can adopt twists and turns along its route and the dipstick assembly can accommodate the tortuous path. For the blade 54 to be fully inserted, handle 56 must engage and interlock with coupler 22 and lugs 30A and 30B extending therefrom. Specifically, lugs 30A and 30B align with the open end of slot 64A and 64B respectively, whereby the handle is further forced over the coupler 22 resulting in lugs 30A and 30B following the curvilinear shape of slots 64A and 64B until locked in locking seats 68. The result in the rotation by approximately 90° of the handle about the coupler 22 as lugs 30A and 30B move from the axial portion of the respective slots into the transverse portion and eventually the locking seat 68.

A seal 80 (FIG. 2C) is located in the base of cavity 82, and preferably glued, bonded or otherwise affixedly seated within the cap. The seal provides a pressure lock seal when the dipstick assembly is fully received in the guide tube. This seal has sufficient elasticity to allow compression of the seal by the coupler 22. This bayonet type locking arrangement provides assurance that fluid level indicator blade 54 is properly positioned for accurate fluid level readings as well as providing a positive lock feature for assuring that handle 56 is locked to stationary tube assembly B. Moreover, the seal provides sufficient sealing capabilities to allow the engine, transmission, or other machinery to reach several atmospheres (preferably at least 1 to 1.5 atm.) of back pressure without leakage. In addition, when fully sealed, the seal prohibits contaminants from entering into the fluid reservoir where system integrity and reliability would be jeopardized, and prohibits unnecessary fluid loss from the assembly. When a compressible and resilient seal is employed, the seal functions to urge the handle and lugs into a locked position, e.g., locking the bayonet mechanism compresses the seal which in turn causes the seal to urge the handle into a locked position relative to the locking lugs.

In one aspect, the coupler 22 and guide tube 10 are fabricated from plastics while connection system 72 is manufactured of high heat tolerating metals or plastics. Handle 56 is typically a molded component to or in which flexible shaft 52 is directly molded, joined, or otherwise connected. The handle is dimensioned to overlie or encompass the coupler or spout in its locked position to prevent contaminants from entering the guide tube. In an alternative aspect of the invention, described below in connection with FIG. 3, the handle is inserted into the spout. Moreover, the use of plastics can reduce corrosive effects and provides an overall reduction in system weight. Yet another advantage of using plastic in forming a number of the components is that the system can be color-coded for ease of use by the customer. Blade 54 is fabricated from steel or other comparable metals or plastics and is attached to flexible shaft 52 by attachment fitting 70 as described above. It will be appreciated, however, that other suitable materials may be used without departing from the scope and intent of the subject invention.

Figure 3:
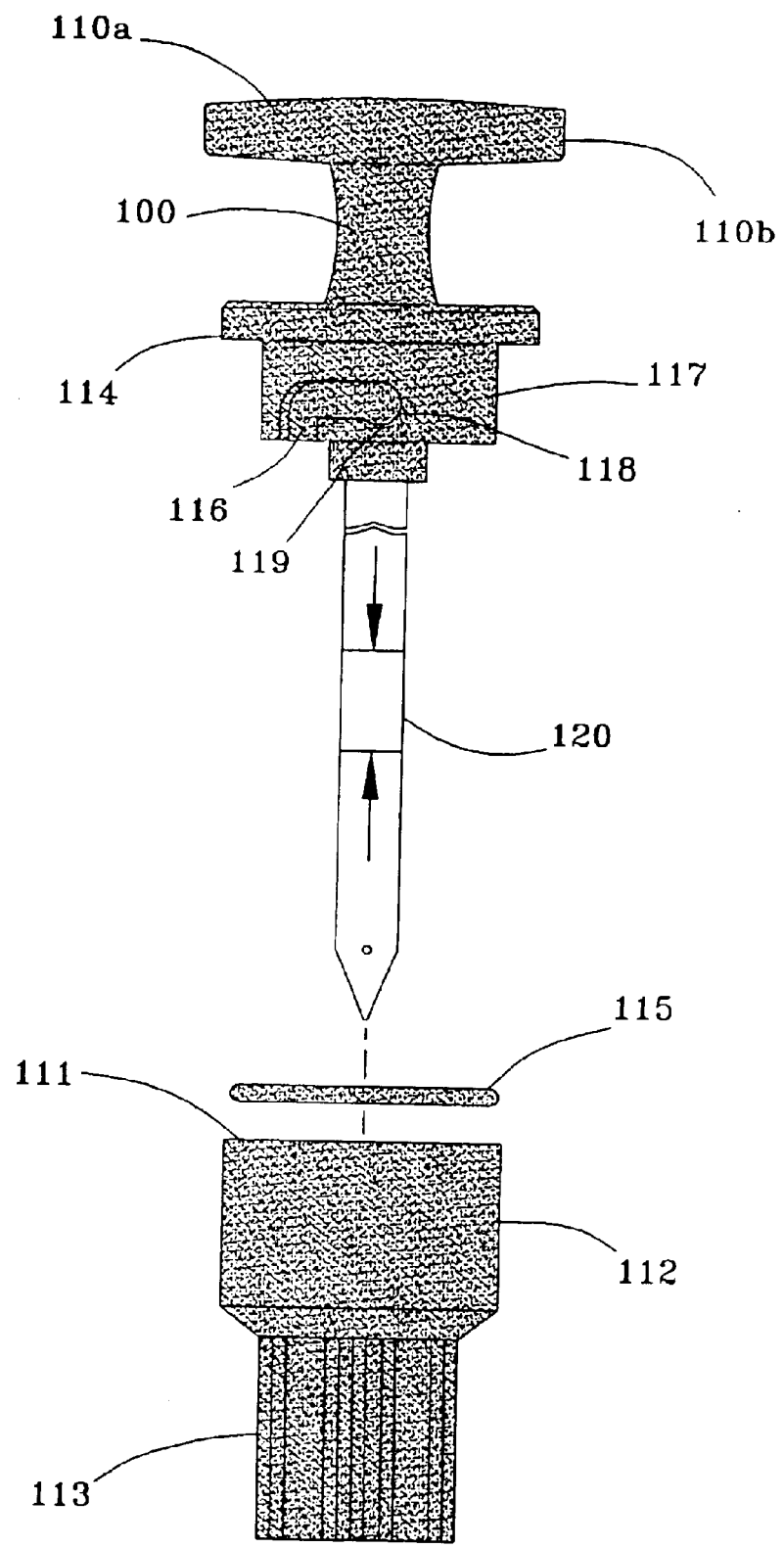
FIG. 3 illustrates another fluid level measuring device that can employ the inventive connection system.

Referring now to FIG. 3, FIG. 3 illustrates another type of fluid level measuring device that can employ the inventive connection system. Referring now to FIG. 10, FIG. 10 illustrates a further aspect of the invention wherein handle 100 is inserted and lockable within opening 111 defined in expanded spout 112 on one end of tube 113. Adjacent to the other end of tube 113 the inventive connection system is attached. Handle 100, as illustrated, includes gripping knobs or areas 110A and 110B. Handle 100 has the previously described bayonet connection, except that handle 100 is inserted within spout 112 and engages locking lugs (not shown) protruding inwardly from the inner surface of spout 112. As the handle 100 is inserted into spout 112, a recessed area (not shown) and defined within shoulder 114 engages gasket 115. Gasket 115 is compressed against shoulder 114 and the interior base of spout 112 as handle 100 is inserted into spout 112. As handle 100 is inserted into spout 112 curvilinear channels 116 (having one open end) defined in side-wall 117 engage inwardly protruding locking lugs on spout 112. Locking lugs travel along channels 116 until reaching area 118 at the closed end of channels 116. A recess 119 defined at area 118 functions to secure the locking lugs in a locked position within channels 116.

A stationary or rotatable dipstick shaft 120 is carried along with handle 100 as handle 100 is inserted into spout 112. As described above, the distal end of dipstick shaft 120 has a blade (not shown) that is employed for measuring a fluid level.

The invention has been described with reference to certain aspects. Obviously, modifications and alterations will occur to others upon a reading and understanding of this specification. Mere reversal of components that achieve substantially the same function and result are contemplated. It is intended to include all such modifications and alterations insofar as they come within the scope of any appended claims or the equivalents thereof.

While the above description places particular emphasis on using the connection system with a fluid level indicator, the inventive system can be employed in a wide range of end uses such as pipe connections, connecting electrical conduit, among other applications wherein a fixed connection or fluid seal is desired.

What is claimed is:

1. A fluid level measuring device comprising:
   a tube having first and second ends wherein the first end of the tube has at least one lug and wherein the second end of the tube has at least one flange or protuberance,
   a handle having at least one slot for engaging the at least one lug of the tube thereby forming a bayonet connection between the tube and handle,
   a shaft associated with the handle and comprising a fluid level measuring blade,
   a tubular member dimensioned for engaging the second end of the tube wherein said flange or protuberance contacts a seat defined by the tubular member and wherein said tubular member is connected to a fitting that connects the tubular member to a reservoir containing the fluid level to be measured,
   an O-ring disposed between and in contact with the second end of the tube and the tubular member; and,
   a retaining means for maintaining the tube in engagement with the tubular member wherein the retaining means is inserted into the tubular member, wherein the tubular member defines at least one opening for receiving the retaining means.

2. The fluid level measuring device of claim 1 wherein the retaining means comprises at least one clip.

3. A fluid level measuring system comprising:
   a tube having first and second ends wherein at least one flange or protuberance is adjacent to the second end of the tube,
   a handle that removably contacts the first end of the tube wherein the handle is connected to a shaft comprising a fluid level measuring blade.
   a tubular member dimensioned for engaging the second end of the tube wherein said flange or protuberance contacts a seat defined by the tubular member,
   a seal disposed between the tube and the tubular member; and,
   retaining means associated with the tubular member that is inserted into the tubular member for maintaining the second end of the tube in engagement with the tubular member and wherein the retaining means engages slots defined on opposite sides of the tubular member.

4. The fluid level measuring system of claim 3 wherein the tube is dimensioned to be received within the tubular member.

5. The fluid level measuring system of claim 3 wherein the tube is received within the tubular member.

6. The fluid level measuring system of claim 3 wherein the handle contacts the first end of the tube by a locking mechanism.

7. The fluid level measuring system of claim 6 wherein the locking mechanism comprises at least one lug defined on the tube and at least one slot defined on the handle and wherein at least one lug engages said at least one slot.

8. The fluid level measuring system of claim 6 wherein the seal comprises an O-ring located about the tube.

9. The fluid level measuring system of claim 6 wherein the seal comprises an O-ring connected to the member.

10. The fluid level measuring system of claim 3 wherein the retaining means comprises at least one member selected from the group consisting of compression, wrist pin, snap-ring or snap-fit connection.

11. The fluid level measuring system of claim 3 wherein the retaining means comprises a clip that is inserted through said slots.

12. The fluid level measuring system of claim 3 wherein the tubular member comprises a second tube that communicates with the fluid level to be measured.

13. A fluid level measuring apparatus comprising:
   a tube having first and second ends wherein at least one flange or protuberance is adjacent to the second end of the tube,
   a handle that removably engages the first end of the tube wherein the handle is connected to a shaft comprising a fluid level measuring blade,
   a connection system for affixing the second end of the tube to a fluid reservoir or to a second tube that is affixed to the fluid reservoir wherein the connection system comprises:
   a hallow cylindrical member dimensioned for receiving the second end of the tube wherein said flange or protuberance contacts a seat defined within the member,
   a seal disposed between the tube and the member; and,
   a means for retaining the second end of the tube within the member that is inserted through at least one opening defined in the member.

14. The apparatus of claim 13 wherein the seal comprises an O-ring.

15. The apparatus of claim 13 wherein the means for retaining comprises at least one member selected from the group consisting of a clip, pin or ring.

16. The apparatus of claim 13 wherein the connection system affixes the second end of the tube to the fluid reservoir.

17. The apparatus of claim 13 wherein the connection system affixes the second end of the tube to a second tube that is affixed to the fluid reservoir.

18. A connection system for connecting a fluid level measuring device to an engine fitting or engine reservoir comprising:
   a first tube having first and second ends wherein the first end of the tube is open in order to receive a fluid level indicator, and at least one flange or protuberance is adjacent to the second end of the tube,
   a tubular outer member dimensioned for receiving the second end of the first tube wherein said outer member comprises a second tube that is connected to the engine fitting or directly to engine reservoir,
   an O-ring disposed between the first tube and outer member; and
   a retaining means associated with the outer member for maintaining the first tube within the outer member and wherein the retaining means is inserted through two openings defined on opposite sides of the outer member.

19. A fluid level measuring device comprising:
   a tube having first and second ends wherein the first end of the tube has at least one lug and wherein the second end of the tube has at least one flange or protuberance,
   a handle having at least one slot for engaging the at least one lug of the tube thereby forming a bayonet connection between the tube and handle,
   a shaft associated with the handle and comprising a fluid level measuring blade,
   a tubular member dimensioned for engaging the second end of the tube wherein said flange or protuberance contacts a seat defined by the tubular member and wherein said tubular member is connected to a fitting that connects the tubular member to a reservoir containing the fluid level to be measured,
   an O-ring disposed between the second end of the tube and the tubular member; and,
   a retaining means for maintaining the tube in engagement with the tubular member and wherein the tubular member defines at least one opening for receiving the retaining means.

* * * * *